US011168008B2

(12) United States Patent
Koizumi

(10) Patent No.: US 11,168,008 B2
(45) Date of Patent: Nov. 9, 2021

(54) ELECTROLYZED WATER GENERATION DEVICE

(71) Applicant: NIHON TRIM CO., LTD., Osaka (JP)

(72) Inventor: Yoshinobu Koizumi, Nankoku (JP)

(73) Assignee: NIHON TRIM CO., LTD., Osaka (JP)

(*) Notice: Subject to any disclaimer, the term of this patent is extended or adjusted under 35 U.S.C. 154(b) by 300 days.

(21) Appl. No.: 16/319,153

(22) PCT Filed: Jul. 20, 2017

(86) PCT No.: PCT/JP2017/026258
§ 371 (c)(1),
(2) Date: Jan. 18, 2019

(87) PCT Pub. No.: WO2018/016577
PCT Pub. Date: Jan. 25, 2018

(65) Prior Publication Data
US 2020/0002194 A1 Jan. 2, 2020

(30) Foreign Application Priority Data
Jul. 21, 2016 (JP) .............................. JP2016-143629

(51) Int. Cl.
C02F 1/461 (2006.01)
C02F 1/00 (2006.01)
(52) U.S. Cl.
CPC ............ C02F 1/4618 (2013.01); C02F 1/001 (2013.01); C02F 2201/4614 (2013.01); C02F 2201/46115 (2013.01); C02F 2201/46135 (2013.01); C02F 2201/46145 (2013.01)

(58) Field of Classification Search
CPC .................. C02F 1/4618; C02F 2201/4614
See application file for complete search history.

(56) References Cited

FOREIGN PATENT DOCUMENTS

| CN | 104925912 A | 9/2015 |
|----|-------------|--------|
| JP | 1984-189871 U | 12/1984 |
| JP | H06-165984 A | 6/1994 |
| JP | H6-335680 A | 12/1994 |

(Continued)

Primary Examiner — Nicholas A Smith
(74) Attorney, Agent, or Firm — Muncy, Geissler, Olds & Lowe, P.C.

(57) ABSTRACT

An electrolyzed water generation device is provided with a first flow passage delivering electrolyzed water generated in one of a first polar chamber and a second polar chamber of an electrolytic chamber, a second flow passage delivering electrolyzed water generated in the other one of the first polar chamber and the second polar chamber, a double autochange crossline valve in which a flow rate regulating valve 74 and a flow passage switching valve 85 are interlocked, a polarity switching unit 51 switching the polarities of a first power feeder 41 and a second power feeder 42, a current detection unit 44 detecting a current to be supplied to the first power feeder 41 and the second power feeder 42, a storage unit 55 storing a switching interval for the polarity switching unit 51 and the flow passage switching valve 85, and a switching control unit 52 switching the polarity and the flow passage switching valve 85 based on the switching timing. The switching control unit 52 changes the switching interval stored in the storage portion 55 based on an integrated value of currents after switching the polarity.

13 Claims, 6 Drawing Sheets

(56) References Cited

FOREIGN PATENT DOCUMENTS

| | | | |
|---|---|---|---|
| JP | 09234469 A | * | 9/1997 |
| JP | 2002-273426 A | | 9/2002 |
| JP | 5639724 B1 | | 12/2014 |
| JP | 2015174060 A | * | 10/2015 |
| JP | 5809208 B2 | | 11/2015 |
| TW | 201536689 A | | 10/2015 |

* cited by examiner

ELECTROLYZED WATER GENERATION DEVICE

TECHNICAL FIELD

The present invention relates to an electrolyzed water generation device generating electrolyzed hydrogen water by electrolyzing water.

BACKGROUND ART

Heretofore, an electrolyzed water generation device is known which is provided with an electrolytic cell having an anode chamber and a cathode chamber which are divided with a membrane and which electrolyzes raw water, such as tap water, to be supplied to the electrolytic cell (for example, see Patent document 1). In the cathode chamber of the electrolyzed water generation device, electrolyzed hydrogen water (electrolyzed reduction water) in which hydrogen gas is melted is generated. In the electrolyzed water generation device, immediately after starting water discharge, water remaining in the electrolytic cell is discharged without being sufficiently electrolyzed in some cases. Therefore, it is desirable not to use water until predetermined time passes from the start of the water discharge (for example, for several seconds) passes.

PRIOR ART DOCUMENT

Patent Document

Patent document 1: JP-A No. 2002-273426

Meanwhile, metal ions, such as calcium ion and magnesium ion, are slightly contained in raw water to be electrolyzed by the electrolytic cell. These metal ions are hard to be removed with a filter and the like. When the metal ions enter the electrolytic cell, the metal ions are deposited as scale inside a cathode chamber including a power feeder or inside a flow passage connected to the downstream side of the cathode chamber.

When the scale adheres to the surface of the power feeder, water is hard to be electrolyzed, so that the dissolved hydrogen concentration of the electrolyzed hydrogen water decreases. Then, an electrolyzed water generation device has been proposed which is configured so that the adhesion of scale to power feeders arranged inside an electrolytic cell is suppressed by switching the polarities of the power feeders as appropriate after stopping electrolysis. In this type of electrolyzed water generation device, when the polarities of the power feeders are switched, the polarities are switched by operating a flow passage switching valve to synchronize upstream and downstream channels of the electrolytic cell, whereby electrolyzed water of the same type as that before the switching can be discharged from a water discharge port, so that an improvement of the usability is achieved.

However, in the electrolytic cell and the flow passage switching valve immediately after switching the polarities of the power feeders, electrolyzed water generated with a different polarity remains. Therefore in order to prevent the mixture of the electrolyzed water generated with a different polarity and obtain desired electrolyzed water, it is necessary to take water after the water is discharged from the water discharge port, and thus relevant waiting time arises. The waiting time until the electrolyzed water generated with a different polarity when the polarities of the power feeders are switched is discharged is longer than waiting time when not switching the polarity, and thus a further improvement has been demanded in order to improve the usability of the electrolyzed water generation device. Moreover, the water generated with a different polarity is put into disposal as discarded water, which is a cause of the impediment of effective use of water.

SUMMARY OF THE INVENTION

Problem to be Solved by the Invention

The present invention has been devised in view of the above-described circumstances. It is a main object of the present invention to provide an electrolyzed water generation device capable of improving the usability while suppressing the adhesion of scale to a power feeder and reducing discarded water.

Means for Solving the Problem

A first invention of the present invention is an electrolyzed water generation device provided with an electrolytic chamber to which water to be electrolyzed is supplied, a first power feeder and a second power feeder disposed facing each other in the electrolytic chamber, and a membrane arranged between the first power feeder and the second power feeder and dividing the electrolytic chamber into a first polar chamber on a side of the first power feeder and a second polar chamber on a side of the second power feeder, characterised in that the electrolyzed water generation device is further provided with a first flow passage delivering electrolyzed water generated in one of the first polar chamber and the second polar chamber to a first water discharge port, a second flow passage delivering electrolyzed water generated in the other one of the first polar chamber and the second polar chamber to a second water discharge port, a flow passage switching valve switching connections of the first polar chamber and the second polar chamber to the first flow passage and the second flow passage, a polarity switching unit switching the polarities of the first power feeder and the second power feeder, a current detection unit detecting a current to be supplied to the first power feeder and the second power feeder, a storage unit storing the switching interval for the polarity switching unit and the flow passage switching valve, and a switching control unit switching the polarity and the flow passage switching valve based on the switching interval, wherein the switching control unit changes the switching interval stored in the storage unit based on the current.

In the electrolyzed water generation device according to the first invention, it is preferable that the switching control unit changes the switching interval stored in the storage unit based on an integrated value of the currents after switching the polarity.

A second invention of the present invention is an electrolyzed water generation device provided with an electrolytic chamber to which water to be electrolyzed is supplied, a first power feeder and a second power feeder disposed facing each other in the electrolytic chamber, and a membrane arranged between the first power feeder and the second power feeder and dividing the electrolytic chamber into a first polar chamber on a side of the first power feeder and a second polar chamber on a side of the second power feeder, characterized in that the electrolyzed water generation device is further provided with a first flow passage delivering electrolyzed water generated in one of the first polar chamber and the second polar chamber to a first water discharge port, a second flow passage delivering electrolyzed water generated in the other one of the first polar chamber and the second polar chamber to a second water discharge port, a flow passage switching valve switching connections of the first polar chamber and the second polar chamber to the first flow passage and the second flow passage, a polarity switching unit switching the polarities of the first power feeder and the second power feeder, a voltage detection unit detecting a voltage to be applied to the first power feeder and the second power feeder, a current detection unit detecting a current to be supplied to the first power feeder and the second power feeder, a storage unit storing the switching interval for the polarity switching unit and the flow passage switching valve, and a switching control unit switching the polarity and the flow passage switching valve based on the switching interval, wherein the switching control unit changes the switching interval stored in the storage unit based on a ratio of the voltage to the current.

In the electrolyzed water generation devices according to the first invention and the second invention, it is preferable that the switching interval is determined by a first threshold value which is the number of times that electrolysis is performed in the electrolytic chamber without the polarity being switched.

In the electrolyzed water generation devices according to the first invention and the second invention, it is preferable that the switching interval is determined by a second threshold value which is the electrolysis time integrated without the polarity being switched.

Effects of Invention

In the electrolyzed water generation device of the first invention, the switching control unit switches the polarity and the flow passage switching valve based on the switching interval for the polarity switching unit and the flow passage switching valve stored in the storage unit. The switching control unit changes the switching interval stored in a storage portion based on the current to be supplied to the first power feeder and the second power feeder after switching the polarity. Thus, a use state (electrolysis degree) different in each user of the electrolyzed water generation device is reflected in the switching interval which the switching control unit refers, so that the switching of the polarity and the flow passage switching valve is controlled at the switching interval suitable for the actual use state. Therefore, the switching control unit switches the polarity and the flow passage switching valve using the switching interval optimized according to the actual use state, whereby the usability can be increased while suppressing the adhesion of scale to the power feeders and discarded water can be reduced.

In the electrolyzed water generation device of the second invention, the switching control unit switches the polarity and the flow passage switching valve based on the switching interval for the polarity switching unit and the flow passage switching valve stored in the storage unit. The switching control unit changes the switching interval stored in the storage portion based on a ratio of the voltage to be applied to the first power feeder and the second power feeder to the current to be supplied to the first power feeder and the second power feeder. Thus, the water environment (water quality) of an area where each electrolyzed water generation device to be used is reflected in the switching interval which the switching control unit refers to, so that the switching of the polarity and the flow passage switching valve is controlled at the switching interval suitable for the actual use environment. Therefore, the switching control unit switches the polarity and the flow passage switching valve using the switching interval optimized according to the actual use environment, whereby the usability can be increased while suppressing the adhesion of scale to the power feeders and discarded water can be reduced.

MODE FOR CARRYING OUT THE INVENTION

Hereinafter, one embodiment of the present invention is described based on the drawings.

Figure 1:
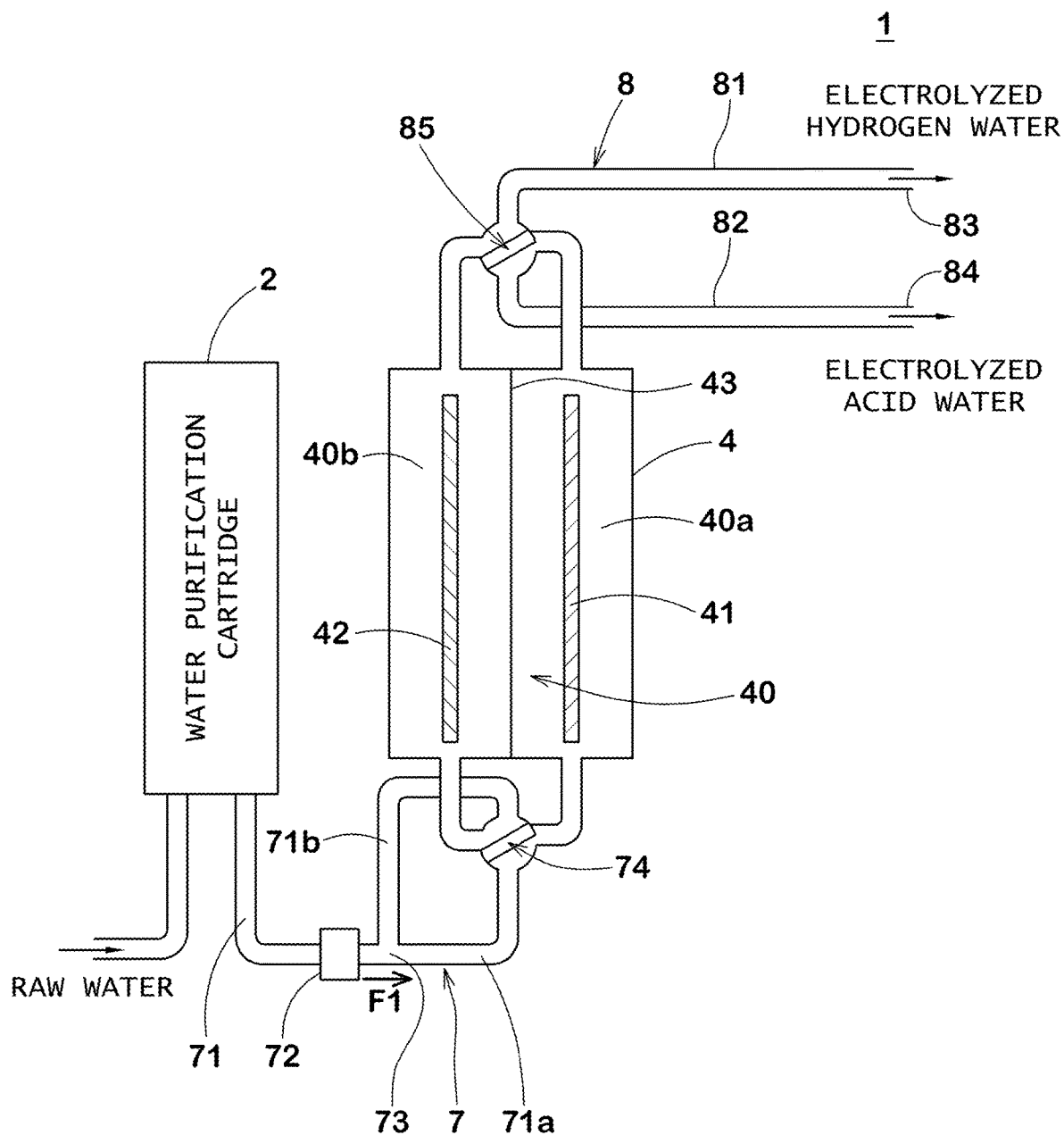
FIG. 1 a view illustrating the flow passage configuration of one embodiment of an electrolyzed water generation device of the present invention.

FIG. 1 illustrates the schematic configuration of an electrolyzed water generation device 1 of this embodiment. In this embodiment, a home electrolyzed water generation device to be used for the generation of domestic drinking water is illustrated as the electrolyzed water generation device 1, for example. FIG. 1 illustrates the electrolyzed water generation device 1 in a state of generating electrolyzed hydrogen water for drinking.

The electrolyzed water generation device 1 is provided with a water purification cartridge 2 purifying water and an electrolytic cell 4 in which an electrolytic chamber 40 to which the purified water is supplied is formed.

The water purification cartridge 2 filters raw water supplied to the electrolyzed water generation device 1 to thereby generate purified water, and then supplies the same to the electrolytic chamber 40. For the raw water, tap water is generally used and, besides the tap water, well water, and groundwater are usable, for example. To the water purification cartridge 2, raw water is supplied from a faucet to which the electrolyzed water generation device 1 is connected. The water purification cartridge 2 is configured so as to be detachable and attachable to the device body of the electrolyzed water generation device 1. Thus, the water purification cartridge 2 which has reached the end of the service life due to use or the lapse of time can be exchanged for a new water purification cartridge 2.

The water purification cartridge 2 is provided on the upstream side of the electrolytic cell 4. Therefore, water purified by the water purification cartridge 2 is supplied to the electrolytic cell 4.

The water purified by the water purification cartridge 2 is electrolyzed in the electrolytic chamber 40. In the electrolytic chamber 40, there are provided a first power feeder 41 and a second power feeder 42 disposed facing each other and a membrane 43 arranged between the first power feeder 41 and the second power feeder 42.

The membrane 43 divides the electrolytic chamber 40 into a first polar chamber 40a on the side of the first power feeder 41 and a second polar chamber 40b on the side of the second power feeder 42. The membrane 43 allows ions produced in electrolysis to pass. The first power feeder 41 and the second power feeder 42 are electrically connected to each other through the membrane 43. When a direct-current voltage is applied between the first power feeder 41 and the second power feeder 42, water is electrolyzed in the electrolytic chamber 40, so that electrolyzed water is obtained.

For example, in the state illustrated in FIG. 1, the first power feeder 41 is positively charged and the first polar chamber 40a functions as an anode chamber. Meanwhile, the second power feeder 42 is negatively charged and the second polar chamber 40b functions as a cathode chamber. More specifically, a reductive electrolyzed hydrogen water in which the generated hydrogen gas is melted is generated in the second polar chamber 40b and electrolyzed acid water in which the generated oxygen gas is melted is generated in the first polar chamber 40a.

Figure 2:
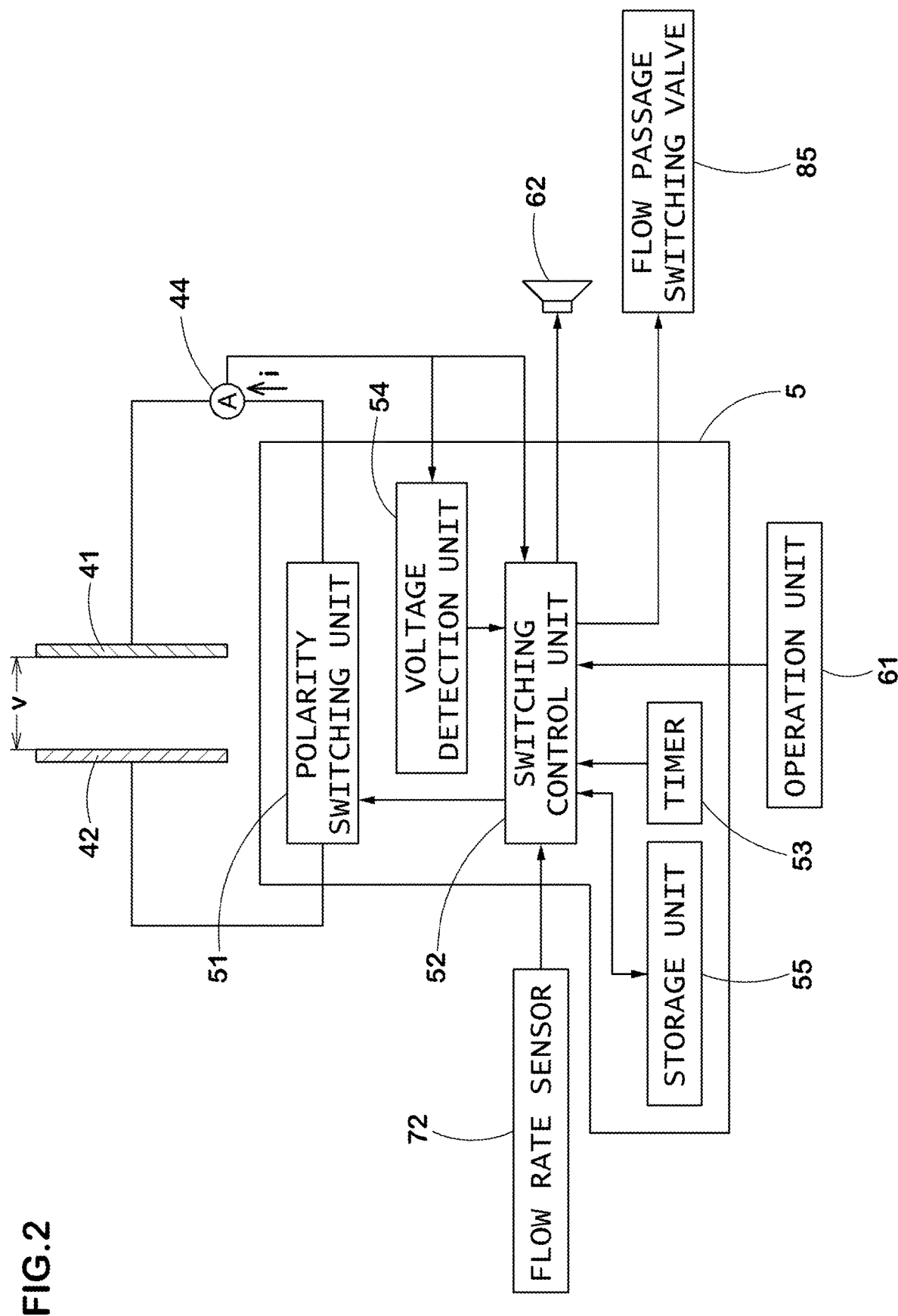
FIG. 2 a block diagram illustrating the electric configuration of the electrolyzed water generation device of FIG. 1.

FIG. 2 illustrates the electric configuration of the electrolyzed water generation device 1. The electrolyzed water generation device 1 is provided with a control unit 5 managing the control of each portion of electrolytic cell 4 and the like, for example.

The first power feeder 41, the second power feeder 42, and the control unit 5 are connected through a current supply line. On the current supply line between the first power feeder 41 and the control unit 5, a current detection unit 44 is provided. The current detection unit 44 may be provided on the current supply line between the second power feeder 42 and the control unit 5. The current detection unit 44 always or periodically detects a direct current (electrolytic current) i to be supplied to the first power feeder 41 and the second power feeder 42 and outputs an electric signal equivalent to the value to the control unit 5.

The control unit 5 controls a direct-current voltage (electrolytic voltage) v to be applied to the first power feeder 41 and the second power feeder 42 based on the electric signal output from the current detection unit 44, for example. More specifically, the control unit 5 feedback-controls a voltage v to be applied to the first power feeder 41 and the second power feeder 42 so that the current i detected by the current detection unit 44 is a desired value according to the dissolved hydrogen concentration set by a user, for example. For example, the control unit 5 reduces the voltage v when the current i is excessively large and the control unit 5 increases the voltage v when the current i is excessively small. Thus, the current i to be supplied to the first power feeder 41 and the second power feeder 42 is appropriately controlled, so that hydrogen water of a desired dissolved hydrogen concentration is generated in the electrolytic chamber 40. The control unit 5 also functions as a voltage detection unit 54 always or periodically detecting the voltage v to be applied to the first power feeder 41 and the second power feeder 42.

The polarities of the first power feeder 41 and the second power feeder 42 are controlled by the control unit 5. More specifically, the control unit 5 functions as a polarity switching unit 51 switching the polarities of the first power feeder 41 and the second power feeder 42. Due to the fact that the control unit 5 switches the polarities of the first power feeder 41 and the second power feeder 42 as appropriate, the opportunities for the first power feeder 41 and the second power feeder 42 to function as an anode chamber or a cathode chamber are equalized. Then, the power feeder functioning as the cathode before the switching of the polarity functions as the anode after the switching of the polarity and cleans scale deposited before the switching. Thus, the adhesion of scale to the first power feeder 41 and the second power feeder 42 is suppressed.

The control unit 5 has a CPU (Central Processing unit) performing various kinds of operation processing and information processing, programs controlling the operation of the CPU, and a memory storing various kinds of information, for example. Various kinds of functions of the control unit 5 are realized by the CPU, the memory, and the programs.

The electrolyzed water generation device 1 operates in various kinds of operation modes under the control by the control unit 5. The operation modes of the electrolyzed water generation device 1 include a "hydrogen water mode" of generating and discharging electrolyzed hydrogen water, an "acid water mode" of generating and discharging electrolyzed acid water, and a "purified water mode" of generating and discharging purified water.

The electrolyzed water generation device 1 has an operation unit 61 to be operated by a user. The operation unit 61 is operated by a user when changing the operation modes of the electrolyzed water generation device 1, for example.

The operation unit 61 has a switch corresponding to each mode, a touch panel detecting the electrostatic capacity, or the like. A user can select water to be generated by the electrolyzed water generation device 1 by operating the operation unit 61. A user can set the dissolved hydrogen concentration of electrolyzed hydrogen water to be generated by the electrolyzed water generation device 1 by operating the operation unit 61. When the operation unit 61 is operated by a user, the operation unit 61 outputs a corresponding electric signal to the control unit 5.

As illustrated in FIG. 1, the electrolyzed water generation device 1 is further provided with a water inlet portion 7 provided on the upstream side of the electrolytic cell 4 and a water outlet portion 8 provided on the downstream side of the electrolytic cell 4.

The water inlet portion 7 has a water supply pipe 71, a flow rate sensor 72, a branching portion 73, a flow rate regulating valve 74, and the like. The water supply pipe 71 supplies water purified by the water purification cartridge 2 to the electrolytic chamber 40. The flow rate sensor 72 is provided on the water supply pipe 71. The flow rate sensor 72 periodically detects a flow rate F1 per unit time of water to be supplied to the electrolytic chamber 40 (hereinafter also simply referred to as "flow rate"), and then outputs a signal equivalent to the value to the control unit 5.

The branching portion 73 branches the water supply pipe 71 into two parts of water supply pipes 71a and 71b. The flow rate regulating valve 74 connects the water supply pipe 71a or 71b to the first polar chamber 40a or the second polar chamber 40b. The flow rate of water to be supplied to the first polar chamber 40a and the second polar chamber 40b is regulated by the flow rate regulating valve 74 under the management of the control unit 5. In this embodiment, the flow rate sensor 72 is provided on the upstream side of the branching portion 73, and therefore detects the total flow rate of the flow rate of water to be supplied to the first polar chamber 40a and the flow rate of water to be supplied to the second polar chamber 40b, i.e., first flow rate F1 of water to be supplied to the electrolytic chamber 40.

The water outlet portion 8 has a flow passage switching valve 85, a first flow passage 81, a second flow passage 82, and the like. The flow passage switching valve 85 switches the connections between the first polar chamber 40a and the second polar chamber 40b and the first flow passage 81 and the second flow passage 82.

In a tip portion of the first flow passage 81, a first water discharge port 83 is provided. The first flow passage 81 delivers electrolyzed water generated in one of the first polar chamber 40a and the second polar chamber 40b to the first water discharge port 83. Similarly, a second water discharge port 84 is provided in a tip portion of the second flow passage 82. The second flow passage 82 delivers electrolyzed water generated in the other one of the first polar chamber 40a and the second polar chamber 40b to the second water discharge port 84.

By synchronizing the switching of the polarities of the first power feeder 41 and the second power feeder 42 and the switching of the flow passage by the flow passage switching valve 85, electrolyzed water (electrolyzed hydrogen water in FIG. 1) selected by a user can be always discharged from one water discharge port (for example, first water discharge port 83).

In the switching of the polarities of the first power feeder 41 and the second power feeder 42, an aspect is desirable in which the control unit 5 interlockingly operates the flow rate regulating valve 74 and the flow passage switching valve 85. Thus, effective use of water is enabled while sufficiently securing the supply amount of water to the polar chamber connected to the first water discharge port 83 before and after the switching of the polarity and suppressing the supply amount of the water to the polar chamber connected to the second water discharge port 84. An aspect is desirable in which the flow rate regulating valve 74 and the flow passage switching valve 85 are integrally formed and are interlockingly driven by a single motor as described in Japanese Patent No. 5809208, for example. More specifically, the flow rate regulating valve 74 and the flow passage switching valve 85 are configured by an outer cylindrical body and an inner cylindrical body having a cylindrical shape or the like. In the inside and the outside of the inner cylindrical body, flow passages configuring the flow rate regulating valve 74 and the flow passage switching valve 85 are formed. The flow passages are configured so as to cross as appropriate according to the operating states of the flow rate regulating valve 74 and the flow passage switching valve 85. Such a valve device is referred to as "double autochange crossline valve" and contributes to the simplification of the configuration and the control of the electrolyzed water generation device 1 and further increases the commercial value of the electrolyzed water generation device 1.

As already described above, the electrolyzed water generation device 1 of the present invention is configured so as to switch the polarities of the first power feeder 41 and the second power feeder 42 as appropriate in order to suppress the adhesion of scale to the surfaces of the first power feeder 41 and the second power feeder 42. The switching of the polarities of the first power feeder 41 and the second power feeder 42 is managed by the control unit 5. Moreover, the control unit 5 controls the flow passage switching valve 85 to switch the connections between the first polar chamber 40a and the second polar chamber 40b and the first flow passage 81 and the second flow passage 82 synchronizing with the switching of the polarities of the first power feeder 41 and the second power feeder 42. More specifically, control unit 5 functions as a switching control unit 52 controlling the switching of the polarities of the first power feeder 41 and the second power feeder 42 and the flow passage switching valve 85.

As illustrated in FIG. 2, the electrolyzed water generation device 1 is provided with a speaker 62 for outputting various kinds of sounds guiding a user's operation. The speaker 62 is controlled by the control unit 5.

In electrolyzed water discharged from the first water discharge port 83 or the like immediately after starting water supply, desired pH and dissolved gas concentration are hard to be obtained. Therefore, this electrolyzed water generation device 1 is configured so as to sound a melody from the speaker 62 after the lapse of a T1 second in which it is presumed that the pH and the dissolved gas concentration of electrolyzed water to be discharged from first water discharge port 83 are stabilized and desired electrolyzed water is obtained. The T1 is set to about several seconds, for example, according to the specification of the electrolytic chamber 40 and the length of the first flow passage 81.

In the first polar chamber 40a, the second polar chamber 40b, and the flow passage switching valve 85 immediately after switching the polarities of the first power feeder 41 and the second power feeder 42 and the flow passage switching valve 85, electrolyzed water generated with a different polarity remains. Therefore, in electrolyzed water generated immediately after switching the polarity of the second power feeder 42 and the flow passage switching valve 85 and jetted from the first discharge port 83 or the like, the electrolyzed water generated with a different polarity is mixed. Then, this electrolyzed water generation device 1 is configured so as to sound a melody from the speaker 62 after the lapse of a T2 (larger than T1) second in which it is presumed that the electrolyzed water generated with a different polarity is discharged from the first water discharge port 83. The T2 is set to about twice the T1, for example, according to the specification of the flow passage switching valve 85 and the length of the first flow passage 81.

The time, such as the T1 second and the T2 second, is counted by the control unit 5. More specifically, the control unit 5 has a function as a timer 53 counting the time based on a clock signal or the like. In the electrolyzed water generation device 1 of this embodiment, the time, such as the T1 second or the T2 second, is set as waiting time until desired electrolyzed water is discharged after starting water supply. By the melody sounded after the lapse of the T1 second and the T2, a user can recognize that desired electrolyzed water selected by operating the operation unit 61 is generated, and thus the usability of the electrolyzed water generation device 1 is increased.

The switching control unit 52 switches the polarities of the first power feeder 41 and the second power feeder 42 and the flow passage switching valve 85 based on information on the "switching interval" (hereinafter referred to as a switching interval). The switching interval is stored in the memory of the control unit 5. The control unit 5 has a function as a storage unit 55 storing the switching interval. The switching interval can be defined by being used for the number of times and the time that the electrolysis is performed in the electrolytic chamber 40 without the polarities being switched, and an integrated value (time integrated value of the current i) I of the currents i, for example. The storage unit 55 stores the upper limits (threshold values) of the number of times and the time that the electrolysis is performed in the electrolytic chamber 40 without the polarity being switched and the integrated value (time integrated value of the current i) I of the currents i.

When the switching interval is set to be large, the frequency that the waiting time until desired electrolysis water is generated after switching the polarity and starting water supply is set to be long from the T1 second to the T2 second decreases, so that the usability of the electrolyzed water generation device 1 is improved but scale tends to be likely to adhere to the power feeders 41 and 42. On the other hand, when the switching interval is set to be small, scale becomes difficult to adhere to the power feeders 41 and 42 but the frequency that the waiting time after starting the water supply is set to the T2 second increases, so that the usability of the electrolyzed water generation device 1 tends to decrease. Therefore, in order to increase the usability while suppressing the adhesion of scale to the power feeders 41 and 42, it is important to perform the switching control of the polarity and the flow passage switching valve 85 at suitable switching intervals. In this embodiment, the switching interval is optimized according to the use state or the use environment of the electrolyzed water generation device 1, whereby the usability can be increased while suppressing the adhesion of scale to the power feeders 41 and 42 and a reduction in discarded water is achieved.

Figure 3:
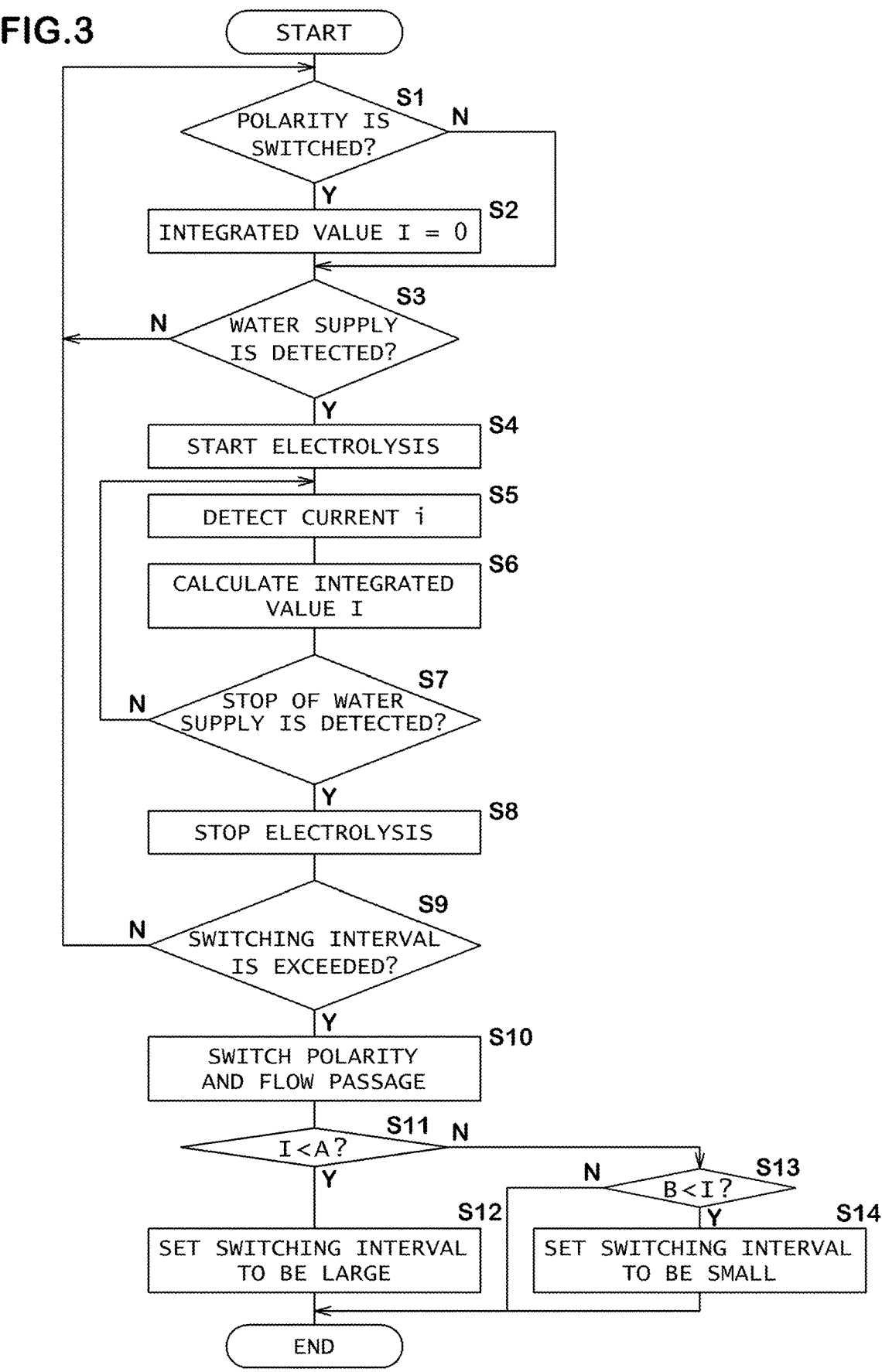
FIG. 3 a flow chart illustrating one embodiment of a processing procedure of changing the switching interval for the polarity and the flow passage in the electrolyzed water generation device of FIG. 2.

FIG. 3 is a flow chart illustrating one embodiment of a processing procedure of changing the switching interval in the electrolyzed water generation device 1. In this flow chart, the switching interval is changed and optimized based on the integrated value I of the currents i after switching the polarity.

The generation amount of scale is dependent on the use state of the electrolyzed water generation device 1. For example, when a user of the electrolyzed water generation device 1 tends to generate a large amount of electrolyzed hydrogen water having a high dissolved hydrogen concentration by one operation of a faucet, a large amount of scale is generated irrespective of the number of times of the electrolysis after switching the polarity. The integrated value I of the currents i is dependent on the dissolved hydrogen concentration and the water supply amount to the electrolytic chamber 40. Then, in this embodiment, the switching interval for the polarity is changed by predicting the adhesion amount of scale based on the integrated value I of the currents i, whereby the switching interval is optimized according to the use state of the electrolyzed water generation device 1. In this flow chart in which the switching interval for the polarity is changed based on the integrated value I, as a parameter, the time in which the current i is supplied is considered, and therefore a detailed use state of the electrolyzed water generation device 1 is likely to be reflected in the switching interval.

In S1, it is determined whether the polarity is switched prior to the generation of electrolyzed water. When the polarity is switched (Y in S1), the integrated value I of the currents i is reset to 0 which is an initial value (S2), and then the process shifts to S3. When the polarity is not switched (N in S1), S2 is skipped, and then the process shifts to S3. In S3, the presence or absence of the water supply is determined through the flow rate sensor 72. When the water supply is not detected (N in S3), the process returns to S1.

When the water supply is detected (Y in S3), the control unit 5 applies a direct-current voltage v to the first power feeder 41 and the second power feeder 42 to start electrolysis (S4). The detection of the water supply and the stop of the water supply is determined based on a signal to be input into the control unit 5 from the flow rate sensor 72. More specifically, the flow rate sensor 72 and the control unit 5 function as water supply detection units. The control unit 5 determines that the state is in the water supply state when the flow rate in the flow rate sensor 72 exceeds a predetermined threshold value and determines that the state is in the water supply stopped state when the flow rate in the flow rate sensor 72 is less than the threshold value.

When the electrolysis starts in S4, the control unit 5 detects the current i based on an electric signal to be output from the current detection unit 44 (S5), and then calculates the integrated value I thereof (S6). The integrated value I is calculated based on I=Σi. The detection of the current i in S5 and the calculation of the integrated value I in S6 are performed by the current detection unit 44 and the switching control unit 52, and then repeated until the stop of the water supply is detected (N in S7). The integrated value I is updated as required. Thereafter, when the stop of the water supply is detected through the flow rate sensor 72 (Y in S7), the control unit 5 stops the application of the direct-current voltage v to the first power feeder 41 and the second power feeder 42 to thereby stop the electrolysis (S8).

Then, the switching control unit 52 determines whether the switching interval is exceeded in S9. When the switching interval is exceeded (Y in S9), the polarities of the power feeders 41 and 42 and the flow passage switching valve 85 are switched (S10). When not reaching the switching interval (N in S9), the process returns to S1. After the polarities of the power feeders 41 and 42 and the flow passage switching valve 85 are switched in S10, the switching control unit 52 compares the integrated value I with a predetermined threshold value A (S11).

When the integrated value I is less than the threshold value A (Y in S11), the switching control unit 52 sets the switching interval to be large, and then ends the processing (S12). Thus, the frequency of switching the polarities of the power feeders 41 and 42 and the flow passage switching valve 85 decreases in the next or succeeding use of the electrolyzed water generation device 1. Therefore, the frequency that the waiting time until desired electrolysis water is generated after switching the polarity and starting the water supply is set to be long from the T1 second to the T2 second decreases, so that the usability of the electrolyzed water generation device 1 is improved.

On the other hand, when the integrated value I is the threshold value A or more (N in S11), the process shifts to S13, and then the switching control unit 52 compares the integrated value I with a predetermined threshold value B. When the integrated value I exceeds the threshold value B (Y in S13), the switching control unit 52 sets the switching interval to be small, and then ends the processing (S14). Thus, the switching interval is optimized in preparation for the detection (S3) of the water supply by the flow rate sensor 72 in the next loop, so that the adhesion of scale to the power feeders 41 and 42 in the next or succeeding use of the electrolyzed water generation device 1 is suppressed.

Furthermore, when the integrated value I is the threshold value A or more and the threshold value B or less (N in S11, N in S13), the processing ends without changing the switching interval on the assumption that the switching interval is within the range of proper values.

Each processing of S1 to S12, S13, or S14 is performed while always being looped in the operation of the electrolyzed water generation device 1. More specifically, after the processing of S12, S13, or S14 is completed, the processing of S1 is performed. More specifically, the control unit 5 switches the polarities of the power feeders 41 and 42 and the flow passage switching valve 85 in S10 to prepare for the detection (S3) of water supply by the flow rate sensor 72 of the next loop. Thus, the power feeder functioning as a cathode to generate electrolyzed hydrogen water in the last loop functions as an anode to clean a deposited scale. Therefore, due to the repetition of such a loop, the electrolyzed hydrogen water generation step and the scale cleaning step are alternately repeated, so that the adhesion of scale to the surfaces of the first power feeder 41 and the second power feeder 42 is continuously suppressed. A use state (electrolysis degree) different in each user of the electrolyzed water generation device 1 is reflected in the switching interval which the switching control unit 52 refers to. Even in the case where the tendency of the use state fluctuates with a change of the season and the like, the switching of the polarity and the flow passage switching valve 85 is controlled at a switching interval suitable for the last use state. Therefore, due to the fact that the switching control unit 52 switches the polarities of the power feeders 41 and 42 and the flow passage switching valve 85 using the switching interval optimized according to the actual use state, the usability of the electrolyzed water generation device 1 can be increased while suppressing the adhesion of scale to the power feeders 41 and 42 and discarded water can be reduced.

Figure 4:
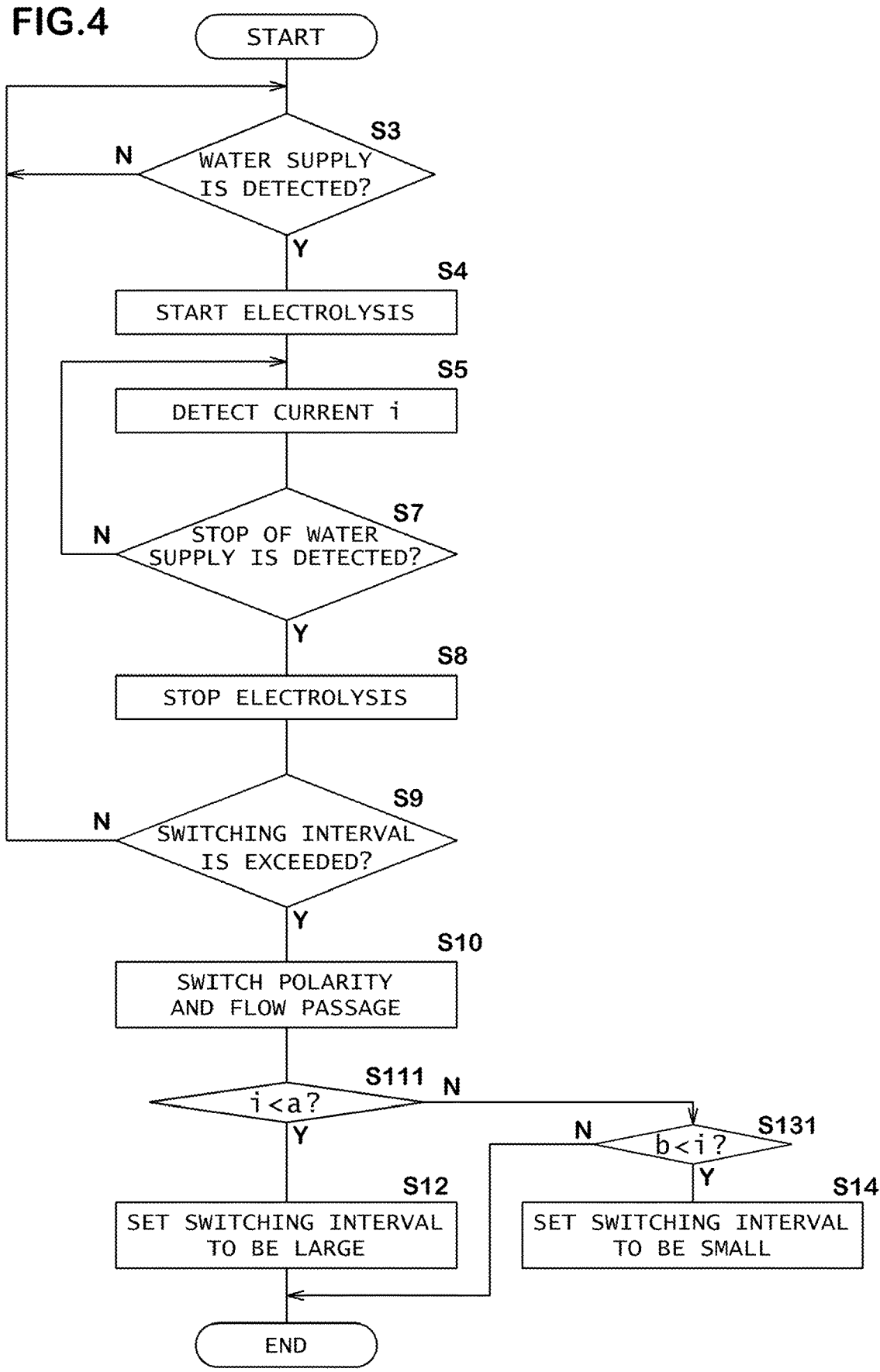
FIG. 4 a flow chart illustrating a modification of the processing procedure of changing the switching interval for the polarity and the flow passage of FIG. 3.

FIG. 4 is a flow chart illustrating a modification of the processing procedure of changing the switching interval in the electrolyzed water generation device 1. As illustrated in the flow chart of FIG. 4, the electrolyzed water generation device 1 may be configured so that the switching control unit 52 changes the switching interval stored in the storage unit 55 based on the current i detected using an electric signal to be output from the current detection unit 44. In this case, each processing, such as the switching of the polarity (S1), the initialization of the integrated value I (S2), and the calculation of the integrated value I (S6) in FIG. 3, is omitted, and thus the processing of the control unit 5 can be simplified. For portions which are not described below in the flow chart of FIG. 4, the processing of FIG. 3 can be adopted.

When the water supply is detected (Y in S3) as illustrated in FIG. 4, the control unit 5 applies the direct-current voltage v to the first power feeder 41 and the second power feeder 42 to start electrolysis (S4), and then detects the current i based on an electric signal to be output from the current detection unit 44 (S5). The detection of the current i in S5 is performed by the current detection unit 44 and the switching control unit 52 and is repeated until the stop of the water supply is detected (N in S7), for example. When it can be determined that the value of the current i is stabilized, the detection of the current i in the loop is skipped. Thereafter, when the stop of the water supply is detected through the flow rate sensor 72 (Y in S7), the control unit 5 stops the application of the direct-current voltage v to the first power feeder 41 and the second power feeder 42 to thereby stop the electrolysis (S8).

Then, the switching control unit 52 determines whether the switching interval is exceeded in S9. When the switching interval is exceeded (Y in S9), the polarities of the power feeders 41 and 42 and the flow passage switching valve 85 are switched (S10). When not reaching the switching interval (N in S9), the process returns to S3. After switching the polarities of the power feeders 41 and 42 and the flow passage switching valve 85 in S10, the switching control unit 52 compares the current i with the predetermined threshold value a (S111).

When the current i is less than the threshold value a (Y in S111), the switching control unit 52 sets the switching interval to be large, and then ends the processing (S12). Thus, the frequency of switching the polarities of the power feeders 41 and 42 and the flow passage switching valve 85 in the next or succeeding use of the electrolyzed water generation device 1 decreases. Therefore, the frequency that the waiting time until desired electrolysis water is generated after switching the polarity and starting the water supply is set to be long from the T1 second to the T2 second decreases as with the processing procedure illustrated in FIG. 3, so that the usability of the electrolyzed water generation device 1 is improved.

On the other hand, when the current i is a threshold value a or more (N in S111), the process shifts to S131, and then the switching control unit 52 compares the current i with a predetermined threshold value b. When the current i exceeds the threshold value b (Y in S131), the switching control unit 52 sets the switching interval to be small, and then ends the processing (S14). Thus, the adhesion of scale to the power feeders 41 and 42 in the next or succeeding use of the electrolyzed water generation device 1 is suppressed as with the processing procedure illustrated in FIG. 3.

Furthermore, when the current i is the threshold value a or more and the threshold value b or less (N in S111, N in S131), the processing ends without changing the switching interval on the assumption that the switching interval is within the range of proper values.

Each processing in S111, S12, S131, and S14 may be moved to the second or succeeding loop of S3 to S9. For example, when each processing in S111, S12, S131, and S14 is moved between S5 and S7, the current i detected in S5 is immediately reflected in the change of the switching interval for the polarity. Therefore, the switching interval can be frequently updated, the switching interval is dynamically optimized according to the use state of the electrolyzed water generation device 1, and the adhesion of scale can be suppressed while increasing the usability of the electrolyzed water generation device 1.

Figure 5:
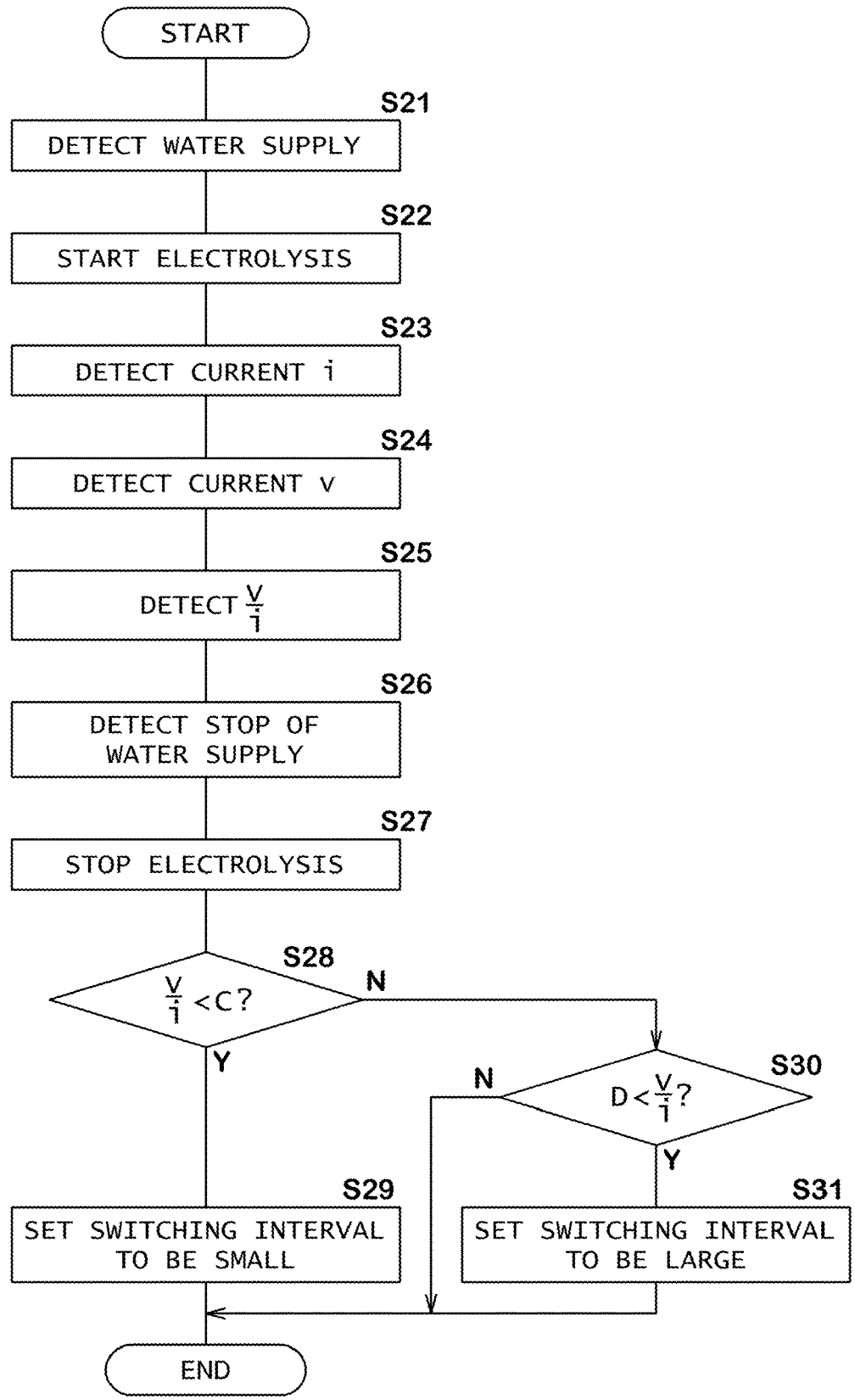
FIG. 5 a flow chart illustrating another embodiment of the processing procedure of changing the switching interval for the polarity and the flow passage.

FIG. 5 is a flow chart illustrating another embodiment of the processing procedure of changing the switching interval in the electrolyzed water generation device 1. In this flow chart, the switching interval is changed and optimized based on the ratio v/i of the voltage v to the current i, i.e., a resistance value of water to be supplied to the electrolytic chamber 40.

In general, the generation amount of scale is also dependent on the water environment of an area where the electrolyzed water generation device 1 is to be used. For example, when the electrolyzed water generation device 1 is used in an area where a large amount of mineral components, such as calcium, which is a cause of scale, are contained in raw water, a large amount of scale is generated irrespective of the integrated value I of the currents i after switching the polarity. Water containing a large amount of the mineral components has a small resistance value. Therefore, a sufficient electrolytic current i tends to be obtained by the application of a relatively low electrolytic voltage v. Then, in this embodiment, the water quality of an area where the electrolyzed water generation device 1 is to be used is presumed based on the ratio v/i of the voltage v to the current i, and then the switching interval for the polarity is changed, whereby the switching interval is optimized according to the use environment of the electrolyzed water generation device 1.

First, when the water supply is detected through the flow rate sensor 72 (S21), the control unit 5 applies the direct-current voltage v to the first power feeder 41 and the second power feeder 42 to start electrolysis (S22).

When the electrolysis starts in S22, the control unit 5 detects the current i based on an electric signal to be output from the current detection unit 44 (S23), and further the control unit 5 detects the voltage v applied to the first power feeder 41 and the second power feeder 42 (S24). Then, the control unit 5 calculates the ratio v/i (S25). Thereafter, when the stop of the water supply is detected through the flow rate sensor 72 (S26), the control unit 5 stops the application of the direct-current voltage v to the first power feeder 41 and the second power feeder 42 to thereby stop the electrolysis (S27). The calculation of the ratio v/i is performed by the switching control unit 52.

Then, the switching control unit 52 compares the ratio v/i with a predetermined threshold value C (S28). When the ratio v/i is less than the threshold value C (Y in S28), the switching control unit 52 sets the switching interval to be small, and then ends the processing (S29). Thus, the adhesion of scale to the power feeders 41 and 42 is suppressed.

On the other hand, when the ratio v/i is the threshold value C or more (N in S28), the process shifts to S30, and then the switching control unit 52 compares the ratio v/i with a predetermined threshold value D. When the ratio v/i exceeds the threshold value D (Y in S30), the switching control unit 52 sets the switching interval to be large, and then ends the processing (S31). Thus, the frequency of switching the polarities of the power feeders 41 and 42 and the flow passage switching valve 85 decreases. Therefore, the frequency that the waiting time until desired electrolysis water is generated after switching the polarity and starting the water supply is set to be long from the T1 second to the T2 second decreases, so that the usability of the electrolyzed water generation device 1 is improved.

Furthermore, when the ratio v/i is the threshold value C or more and the threshold value D or less (N in S28, N in S30), the processing ends without changing the switching interval on the assumption that the switching interval is within the range of proper values.

It is desirable that each processing in S21 to S29, S30, or S31 is performed when the use environment of the electrolyzed water generation device 1 fluctuates. For example, a configuration may be acceptable in which the switching interval is changed based on the ratio v/i of the voltage v to the current i by operating the operation unit 61 by a user. Moreover, a configuration may be acceptable in which the switching interval is periodically changed based on the ratio v/i of the voltage v to the current i. Thus, in the electrolyzed water generation device 1 in which the switching interval is changed based on the ratio v/i of the voltage v to the current i, the use environment of each electrolyzed water generation device 1 is reflected in the switching interval which the switching control unit 52 refers to. Thus, the switching of the polarities of the power feeders 41 and 42 and the flow passage switching valve 85 is controlled at the switching interval suitable for the actual use environment. Therefore, due to the fact that the switching control unit 52 switches the polarities of the power feeders 41 and 42 and the flow passage switching valve 85 using the switching interval optimized according to the actual use environment, the usability can be increased while suppressing the adhesion of scale to the power feeders 41 and 42 and discarded water can be reduced.

The electrolyzed water generation device 1 may be configured so that at least either one of the processing of changing the switching interval illustrated in FIG. 3 or FIG. 4 and the processing of changing the switching interval illustrated in FIG. 5 is performed. By changing the switching interval by combining the processing of changing the switching interval illustrated in FIG. 3 or FIG. 4 and the processing of changing the switching interval illustrated in FIG. 5, the usability can be increased while further suppressing the adhesion of scale to the power feeders 41 and 42 and discarded water can be reduced.

Figure 6:
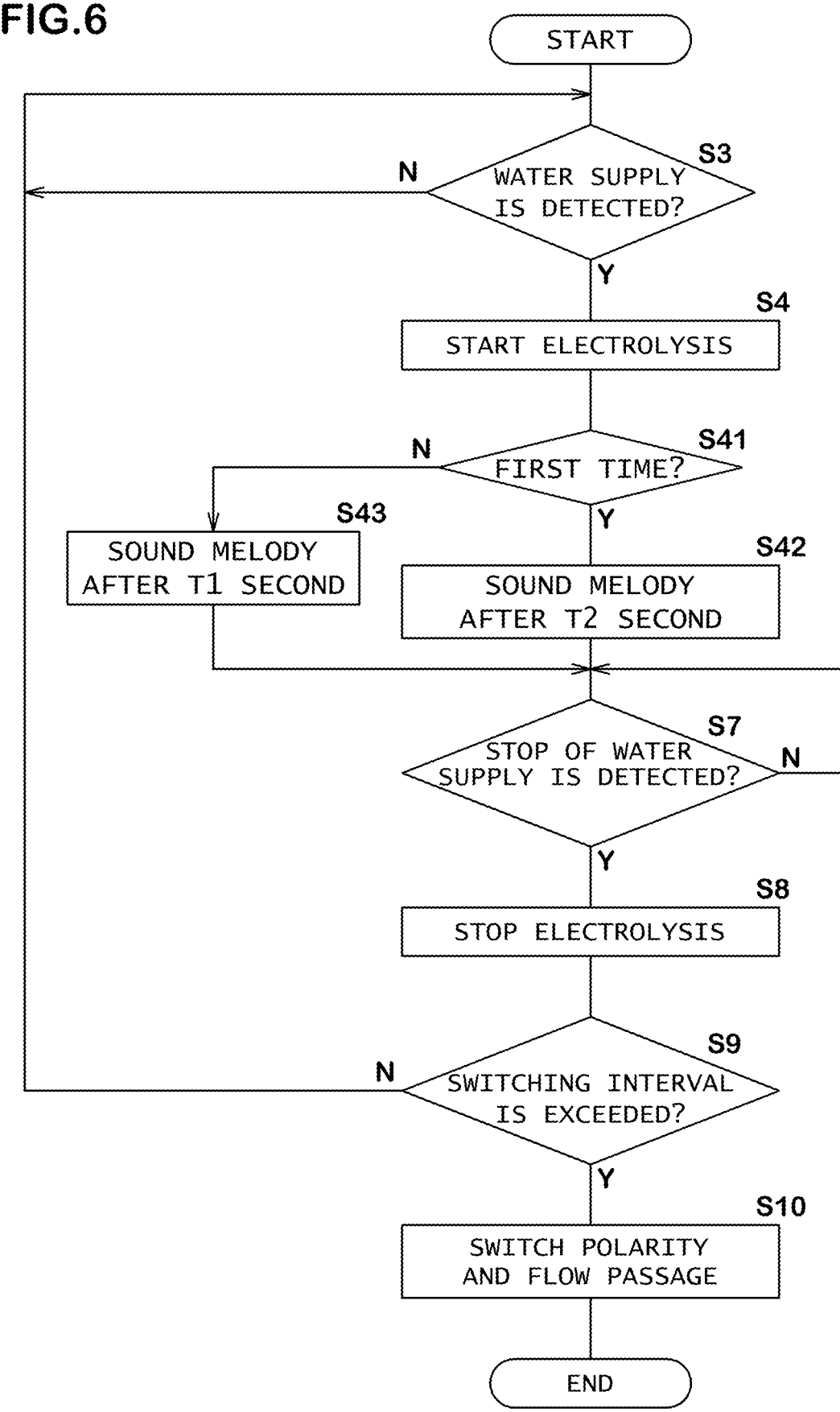
FIG. 6 a flow chart illustrating the processing procedure of switching the polarity and the flow passage using the switching interval illustrated in FIGS. 3 to 5.

FIG. 6 is a flow chart illustrating the processing of switching the polarities of the first power feeder 41 and the second power feeder 42 and the flow passage switching valve 85. The processing of switching the polarity of the second power feeder 42 and the flow passage switching valve 85 can be integrated with the processing of changing the switching interval illustrated in FIG. 3 (or FIG. 4) by inserting each processing in S41 to S43 in FIG. 6 between S6 and S7 in FIG. 3 (or between S5 and S7 in FIG. 4).

In FIG. 6, when the water supply is detected through the flow rate sensor 72 (Y in S3), the control unit 5 applies the direct-current voltage v to the first power feeder 41 and the second power feeder 42 to start electrolysis (S4).

Then, the control unit 5 determines whether the electrolysis is the first electrolysis after switching the polarities of the first power feeder 41 and the second power feeder 42 and the flow passage switching valve 85 (S41). In the determination in S41, the switching control unit 52 can easily perform the determination by counting the number of times of the electrolysis after switching the polarities of the power feeders 41 and 42 and the flow passage switching valve 85.

When the switching control unit 52 determines that the electrolysis is the first electrolysis after switching the polarity and the like (Y in S41), the switching control unit 52 causes the speaker 62 to output a melody after the lapse of the T2 second (S42), and then shifts to S7. Meanwhile, when the switching control unit 52 determines that the electrolysis is the second or succeeding electrolysis after switching the polarity and the like (N in S41), the switching control unit 52 causes the speaker 62 to output a melody after the lapse of the T1 second (S43), and then shifts to S7. Each processing in S8 to S10 in and after S7 is the same as that of FIGS. 3 and 4.

As described above, the electrolyzed water generation device 1 of the present invention is described in detail but the present invention is altered to various aspects to be implemented without being limited to the specific embodiment described above. More specifically, the electrolyzed water generation device 1 may be configured so as to be provided with at least the electrolytic chamber 40 to which water to be electrolyzed is supplied, the first power feeder 41 and the second power feeder 42 disposed facing each other in the electrolytic chamber 40, and the membrane 43 arranged between the first power feeder 41 and the second power feeder 42 and dividing the electrolytic chamber 40 into the first polar chamber 40a on the side of the first power feeder 41 and the second polar chamber 40b on the side of the second power feeder 42, and further to be provided with the first flow passage 81 delivering electrolyzed water generated in one of the first polar chamber 40a and the second polar chamber 40b to the first water discharge port 83, the second flow passage 82 delivering electrolyzed water generated in the other one of the first polar chamber 40a and the second polar chamber 40b to the second water discharge port 84, the flow passage switching valve 85 switching the connections between the first polar chamber 40a and the second polar chamber 40b and the first flow passage 81 and the second flow passage 82, the polarity switching unit 51 switching the polarities of the first power feeder 41 and the second power feeder 42, the current detection unit 44 detecting the current i to be supplied to the first power feeder 41 and the second power feeder 42, the storage unit 55 storing the switching interval for the polarity switching unit 51 and the flow passage switching valve 85, and the switching control unit 52 switching the polarity and the flow passage switching valve 85 based on the switching interval and configured so that the switching control unit 52 changes the switching interval stored in the storage unit 55 based on the current i.

Moreover, the electrolyzed water generation device 1 may be configured so as to be provided with at least the electrolytic chamber 40 to which water to be electrolyzed is supplied, the first power feeder 41 and the second power feeder 42 disposed facing each other in the electrolytic chamber 40, and the membrane 43 arranged between the first power feeder 41 and the second power feeder 42 and dividing the electrolytic chamber 40 into the first polar chamber 40a on the side of the first power feeder 41 and the second polar chamber 40b on the side of the second power feeder 42, and further to be provided with the first flow passage 81 delivering electrolyzed water generated in one of the first polar chamber 40a and the second polar chamber 40b to the first water discharge port 83, the second flow passage 82 delivering electrolyzed water generated in the other one of the first polar chamber 40a and the second polar chamber 40b to the second water discharge port 84, the flow passage switching valve 85 switching the connections between the first polar chamber 40a and the second polar chamber 40b and the first flow passage 81 and the second flow passage 82, the polarity switching unit 51 switching the polarities of the first power feeder 41 and the second power feeder 42, the voltage detection unit 54 detecting the voltage to be applied to the first power feeder 41 and the second power feeder 42, the current detection unit 44 detecting the current i to be supplied to the first power feeder 41 and the second power feeder 42, the storage unit 55 storing the switching interval for the polarity switching unit 51 and the flow passage switching valve 85, and the switching control unit 52 switching the polarity and the flow passage switching valve 85 based on the switching interval and configured so that the switching control unit 52 changes the switching interval stored in the storage unit 55 based on the ratio v/i of the voltage v to the current i.

DESCRIPTION OF REFERENCE SIGNS 1 electrolyzed water generation device
40 electrolytic chamber
40a first polar chamber
40b second polar chamber
41 first power feeder
42 second power feeder
43 membrane
44 current detection unit
51 polarity switching unit
52 switching control unit
54 voltage detection unit
55 storage unit
72 flow rate sensor
81 first flow passage
82 second flow passage
83 first water discharge port
84 second water discharge port
85 flow passage switching valve

The invention claimed is:
1. An electrolyzed water generation device comprising:
an electrolytic chamber to which water to be electrolyzed is supplied;
a first power feeder and a second power feeder disposed facing each other in the electrolytic chamber; and
a membrane arranged between the first power feeder and the second power feeder and dividing the electrolytic chamber into a first polar chamber on a side of the first power feeder and a second polar chamber on a side of the second power feeder, characterized in that the electrolyzed water generation device further comprises:
a first flow passage delivering electrolyzed water generated in one of the first polar chamber and the second polar chamber to a first water discharge port;
a second flow passage delivering electrolyzed water generated in another one of the first polar chamber and the second polar chamber to a second water discharge port;
a flow passage switching valve switching connections of the first polar chamber and the second polar chamber to the first flow passage and the second flow passage;
a polarity switching unit switching polarities of the first power feeder and the second power feeder;
a current detection unit detecting a current to be supplied to the first power feeder and the second power feeder;
a storage unit storing a switching interval for the polarity switching unit and the flow passage switching valve; and
a switching control unit switching the polarity and the flow passage switching valve based on the switching interval, wherein
the switching control unit is programmed to change the switching interval stored in the storage unit based on the current.

2. The electrolyzed water generation device according to claim 1, wherein
the switching control unit is programmed to change the switching interval stored in the storage unit based on an integrated value of the currents after switching the polarity.

3. The electrolyzed water generation device according to claim 1, wherein
the switching interval is programmed to be determined by a first threshold value which is a number of times that electrolysis is performed in the electrolytic chamber without the polarity being switched.

4. The electrolyzed water generation device according to claim 1, wherein
the switching interval is programmed to be determined by a second threshold value which is electrolysis time integrated without the polarity being switched.

5. The electrolyzed water generation device according to claim 1, further comprising:
a speaker that outputs sound, wherein
the electrolyzed water generation device is programmed to cause the speaker to sound a melody after a T1 second lapses, which is counted immediately after starting to supply the electrolyzed water, wherein the T1 second is presumed during which pH and dissolved gas concentration of the electrolyzed water to be discharged from the first water discharge port reach desired amounts.

6. The electrolyzed water generation device according to claim 1, further comprising:
a speaker that outputs sound, wherein
the electrolyzed water generation device is programmed to cause the speaker to sound a melody after a T2 second lapses, which is counted immediately after
the polarity switching unit switches the polarities of the first power feeder and the second power feeder wherein the polarities are defined to be switched from a previous polarity to a current polarity, and
the flow passage switching valve switches the connections of the first polar chamber and the second polar chamber, wherein
the T2 second is presumed during which the electrolyzed water generated with the previous polarity is fully discharged from the first water discharge port and the second water discharge port.

7. The electrolyzed water generation device according to claim 5, wherein
the electrolyzed water generation device is programmed to cause the speaker to sound a melody after a T2 second lapses, which is counted immediately after
the polarity switching unit switches the polarities of the first power feeder and the second power feeder wherein the polarities are defined to be switched from a previous polarity to a current polarity, and
the flow passage switching valve switches the connections of the first polar chamber and the second polar chamber, wherein
the T2 second is presumed during which the electrolyzed water generated with the previous polarity is fully discharged from the first water discharge port and the second water discharge port, and
the T2 second is greater than the T1 second.

8. An electrolyzed water generation device comprising:
an electrolytic chamber to which water to be electrolyzed is supplied;
a first power feeder and a second power feeder disposed facing each other in the electrolytic chamber; and
a membrane arranged between the first power feeder and the second power feeder and dividing the electrolytic chamber into a first polar chamber on a side of the first power feeder and a second polar chamber on a side of the second power feeder, characterized in that the electrolyzed water generation device further comprises:
a first flow passage delivering electrolyzed water generated in one of the first polar chamber and the second polar chamber to a first water discharge port;
a second flow passage delivering electrolyzed water generated in another one of the first polar chamber and the second polar chamber to a second water discharge port;
a flow passage switching valve switching connections of the first polar chamber and the second polar chamber to the first flow passage and the second flow passage;
a polarity switching unit switching polarities of the first power feeder and the second power feeder;
a voltage detection unit detecting a voltage to be applied to the first power feeder and the second power feeder;
a current detection unit detecting a current to be supplied to the first power feeder and the second power feeder;
a storage unit storing a switching interval for the polarity switching unit and the flow passage switching valve; and
a switching control unit switching the polarity and the flow passage switching valve based on the switching interval, wherein
the switching control unit is programmed to change the switching interval stored in the storage unit based on a ratio of the voltage to the current.

9. The electrolyzed water generation device according to claim 8, wherein
the switching interval is programmed to be determined by a first threshold value which is a number of times that electrolysis is performed in the electrolytic chamber without the polarity being switched.

10. The electrolyzed water generation device according to claim 8, wherein
the switching interval is programmed to be determined by a second threshold value which is electrolysis time integrated without the polarity being switched.

11. The electrolyzed water generation device according to claim 8, further comprising:
a speaker that outputs sound, wherein
the electrolyzed water generation device is programmed to cause the speaker to sound a melody after a T1 second lapses, which is counted immediately after starting to supply the electrolyzed water, wherein the T1 second is presumed during which pH and dissolved gas concentration of the electrolyzed water to be discharged from the first water discharge port reach desired amounts.

12. The electrolyzed water generation device according to claim 8, further comprising:
a speaker that outputs sound, wherein
the electrolyzed water generation device is programmed to cause the speaker to sound a melody after a T2 second lapses, which is counted immediately after
the polarity switching unit switches the polarities of the first power feeder and the second power feeder wherein the polarities are defined to be switched from a previous polarity to a current polarity, and
the flow passage switching valve switches the connections of the first polar chamber and the second polar chamber, wherein
the T2 second is presumed during which the electrolyzed water generated with the previous polarity is fully discharged from the first water discharge port and the second water discharge port.

13. The electrolyzed water generation device according to claim 11, wherein
the electrolyzed water generation device is programmed to cause the speaker to sound a melody after a T2 second lapses, which is counted immediately after
the polarity switching unit switches the polarities of the first power feeder and the second power feeder wherein the polarities are defined to be switched from a previous polarity to a current polarity, and
the flow passage switching valve switches the connections of the first polar chamber and the second polar chamber, wherein
the T2 second is presumed during which the electrolyzed water generated with the previous polarity is fully discharged from the first water discharge port and the second water discharge port, and
the T2 second is greater than the T1 second.

* * * * *